United States Patent
Sakai

(10) Patent No.: US 9,811,715 B2
(45) Date of Patent: Nov. 7, 2017

(54) IMAGE GENERATOR AND IMAGE GENERATION METHOD

(71) Applicant: OMRON Corporation, Kyoto-shi, Kyoto (JP)

(72) Inventor: Shun Sakai, Shiga (JP)

(73) Assignee: OMRON Corporation, Kyoto (JP)

(*) Notice: Subject to any disclaimer, the term of this patent is extended or adjusted under 35 U.S.C. 154(b) by 137 days.

(21) Appl. No.: 14/827,896

(22) Filed: Aug. 17, 2015

(65) Prior Publication Data

US 2016/0267318 A1    Sep. 15, 2016

(30) Foreign Application Priority Data

Mar. 9, 2015    (JP) .................. 2015-046008

(51) Int. Cl.
*G06K 9/00* (2006.01)
*G06T 5/00* (2006.01)
(Continued)

(52) U.S. Cl.
CPC ....... *G06K 9/00228* (2013.01); *G06K 9/4661* (2013.01); *G06T 5/009* (2013.01); *H04N 1/56* (2013.01); *H04N 5/202* (2013.01); *H04N 5/2351* (2013.01); *H04N 9/64* (2013.01); *G09G 2320/0673* (2013.01)

(58) Field of Classification Search
None
See application file for complete search history.

(56) References Cited

U.S. PATENT DOCUMENTS 4,661,862 A * 4/1987 Thompson ........... H04N 11/006
                                                348/E11.004
6,266,102 B1 * 7/2001 Azuma .................. H04N 5/202
                                                348/252
(Continued)

FOREIGN PATENT DOCUMENTS

| EP | 2 086 217 A1 | 8/2009 |
| JP | 2009-025701 A | 2/2009 |
| WO | 2009/063553 A1 | 5/2009 |

OTHER PUBLICATIONS

Extended European Search Report in counterpart European Patent Application No. 15 17 9471.6 dated Aug. 11, 2016 (13 pages).
(Continued)

*Primary Examiner* — Jayesh A Patel
(74) *Attorney, Agent, or Firm* — Osha Liang LLP

(57) ABSTRACT

An image generator configured to generate a face detecting image used in face detection processing of detecting a face from an image, has a representative luminance calculator that calculates a representative luminance value representing a luminance value of each pixel of a photographed image obtained by photographing; and a gamma converter that generates the face detecting image by performing gamma conversion processing on the photographed image. The luminance value of each pixel of the image is converted using a predetermined gamma value. The gamma converter performs the gamma conversion processing using a first gamma value when the representative luminance value calculated by the representative luminance calculator is greater than or equal to a predetermined threshold.

19 Claims, 9 Drawing Sheets

(51) Int. Cl.
  *H04N 5/202*   (2006.01)
  *H04N 1/56*    (2006.01)
  *G06K 9/46*    (2006.01)
  *H04N 5/235*   (2006.01)
  *H04N 9/64*    (2006.01)

(56) References Cited

U.S. PATENT DOCUMENTS

| | | | | |
|---|---|---|---|---|
| 6,311,328 | B1* | 10/2001 | Miyazaki | G06T 3/4007 340/670 |
| 6,373,897 | B1* | 4/2002 | Taniguchi | G08G 1/04 348/699 |
| 8,121,404 | B2* | 2/2012 | Xiao | G03B 7/091 348/229.1 |
| 9,253,374 | B2* | 2/2016 | Kobayashi | H04N 5/202 |
| 2002/0036716 | A1* | 3/2002 | Ito | H04N 5/202 348/674 |
| 2003/0001975 | A1* | 1/2003 | Takeda | H04N 5/243 348/678 |
| 2007/0092137 | A1* | 4/2007 | Zhao | G06T 3/40 382/169 |
| 2009/0060379 | A1* | 3/2009 | Manabe | H04N 5/2351 382/274 |
| 2009/0309994 | A1* | 12/2009 | Inoue | H04N 1/407 348/223.1 |
| 2010/0209015 | A1 | 8/2010 | Yu et al. | |
| 2012/0026352 | A1* | 2/2012 | Natroshvili | G06T 7/13 348/222.1 |
| 2012/0314971 | A1* | 12/2012 | Yuan | G06T 5/008 382/274 |
| 2013/0027540 | A1* | 1/2013 | Ito | G01B 11/08 348/79 |

OTHER PUBLICATIONS

M. Villegas et al; "Comparison of Illumination Normalization Methods for Face Recognition"; Third Cost 275 Workshop-Biometrics on the Internet, pp. 27-30; Retrieved from Internet on Aug. 2, 2016; Retrieved from Internet: URL: http://mvillegas.info/pub/Villegas05_COST275_FaceIllum.pdf.

* cited by examiner

IMAGE GENERATOR AND IMAGE GENERATION METHOD

CROSS-REFERENCE TO RELATED APPLICATION

This application claims priority to Japanese Patent Application No. 2015-046008 filed with the Japan Patent Office on Mar. 9, 2015, the entire contents of which are incorporated herein by reference.

BACKGROUND

Field

The present invention relates to an image generator and an image generation method for generating an image used in face detection processing of detecting a face from the image.

Related Art

Recently face detection processing of detecting a face from a photographed image obtained by photographing becomes widespread, and is applied to devices such as a digital camera and a smartphone. It is considered that a variation of a face detection processing device increases in future. For example, it is conceivable that the face detection processing is performed with a television set or a monitoring system. For example, when an application of the television set performs face authentication processing or face attribute estimation processing including the face detection processing, a viewer can be identified, or sexuality or age of the viewer can be estimated. As a result, useful information for the viewer (such as recommended program information) can be provided to the viewer. For example, when an application of the monitoring system performs the face authentication processing or face attribute estimation processing including the face detection processing, the detected face is registered for the purpose of crime prevention, a registrant can be authenticated, or the sexuality or age of the registrant can be estimated. As a result, a video analysis can be performed at high speed.

Generally, a light and dark pattern unique to the face (light and dark portions having a positional relationship unique to the face) exists in a facial region of a region of the photographed image. For example, the regions near facial organs such as an eye, a nose, and a mouth include a large number of dark pixels, and other regions include a large number of light pixels. For this reason, in the face detection processing, generally a feature amount is acquired from the image in consideration of the light and dark pattern unique to the face, and the face is detected based on the acquired feature amount. For example, a Haar-like feature amount that is of a difference in luminance between two regions having positional relationship equivalent to the light and dark pattern unique to the face is used as the feature amount.

There is a large amount of information on a light and dark pattern unique to the face in the image in which contrast (difference in luminance between the light and dark portions of the image) remains to a certain extent. Therefore, the face can accurately be detected from the image in which the contrast remains. On the other hand, there is a small amount of information on the light and dark pattern unique to the face in the image having the low contrast. Therefore, the face is hardly detected from the image having the low contrast. Accordingly, the image in which the contrast remains is suitable for the face detection processing.

However, a variation of the photographing environment (for example, lightness around a subject) of the photographed image increases with increasing variation of the face detection processing device. Therefore, the face detection processing is performed using various photographed images from a light photographed image to a dark photographed image, and the face detection processing is performed using the photographed image having the lightness that is unexpected in the conventional face detection processing. For example, sometimes the television set or the monitoring system is used in the dark environment. In the face detection processing performed by the television set, there is a possibility that the photographed image obtained in the dark photographing environment is used.

When the photographing environment changes, a luminance distribution of the photographed image changes, and therefore the contrast changes. As a result, sometimes accuracy of the face detection processing degrades. For example, in the photographed image obtained in the dark photographing environment, a skin region except for a region near a facial organ is also darkened to lower the contrast of the image. Therefore, an information amount associated with the light and dark pattern unique to the face is faded, and the face is hardly detected. Similarly, in the case that the face becomes excessively light by illumination or ambient light, the contrast of the photographed image is lowered, the information amount associated with the light and dark pattern unique to the face is faded, and the face is hardly detected.

Conventionally various pieces of image processing are proposed in order to obtain the desired image. For example, Japanese Translation of PCT Publication No. 2009/063553 and Unexamined Japanese Patent Publication No. 2009-025701 disclose a technology associated with the image processing. However, the secure image (the image in which the contrast remains) suitable for the face detection processing can hardly be obtained even if the conventional technology (such as the technologies disclosed in Japanese Translation of PCT Publication No. 2009/063553 and Unexamined Japanese Patent Publication No. 2009-025701) is used.

For example, in the technology disclosed in Japanese Translation of PCT Publication No. 2009/063553, the image processing is not performed in the case that the whole image is dark. Therefore, even if the technology disclosed in Japanese Translation of PCT Publication No. 2009/063553 is used, the image suitable for the face detection processing can hardly be obtained from the dark photographed image (the photographed image obtained in the dark photographing environment).

In the technology disclosed in Unexamined Japanese Patent Publication No. 2009-025701, only a gamma characteristic (gamma curve) is switched based on whether the number of colors included in the image is greater than or equal to a threshold, but the lightness of the image is not considered. Therefore, the image suitable for the face detection processing can hardly be obtained even if the technology disclosed in Unexamined Japanese Patent Publication No. 2009-025701 is used.

SUMMARY

One or more embodiments of the present invention generates an image while enabling high-accuracy face detection processing.

According to one or more embodiments of the present invention, an image generator configured to generate a face detecting image used in face detection processing of detecting a face from an image, the image generator includes: a representative luminance calculation unit configured to calculate a representative luminance value representing a luminance value of each pixel of a photographed image obtained by photographing; and a gamma conversion unit configured to generate the face detecting image by performing gamma conversion processing on the photographed image, the luminance value of each pixel of the image being converted using a predetermined gamma value. At this point, the gamma conversion unit performs the gamma conversion processing using a first gamma value when the representative luminance value calculated by the representative luminance calculation unit is greater than or equal to a predetermined threshold, and the gamma conversion unit performs the gamma conversion processing using a second gamma value when the representative luminance value is less than the predetermined threshold, a face detecting image lighter than the face detecting image obtained by using the first gamma value being able to be obtained by using the second gamma value.

At this point, in the case that the calculated representative luminance value is greater than or equal to the predetermined threshold, there is a high possibility that the photographed image is obtained in a light photographing environment. In the case that the calculated representative luminance value is less than the predetermined threshold, there is a high possibility that the photographed image is obtained in a dark photographing environment. Therefore, when one gamma value (the first gamma value) is always used, there is a risk of generating the face detecting image having low contrast for the calculated representative luminance value less than the predetermined threshold.

In an image generator according to one or more embodiments of the present invention, the second gamma value is used in the case that the calculated representative luminance value is less than the predetermined threshold. This enables the generation of the face detecting image having the lighter whole image and the higher contrast compared with the case of using the first gamma value. As a result, in an image generator according to one or more embodiments of the present invention, the face detecting image enabling the high-accuracy face detection processing can be generated irrespective of the lightness of the photographed image.

According to one or more embodiments of the present invention, the predetermined threshold is larger than 0.25 and smaller than 0.41 when the possible representative luminance value ranges from 0 to 1. The face detecting image enabling the high-accuracy face detection processing can be generated using this value.

For example, the gamma conversion processing of calculating a luminance value Yb of the face detecting image from a predetermined gamma value G, a luminance value Ya of the photographed image, and a maximum possible value Ymax of the possible luminance value is performed using the following equation 1.

$$Yb = Ymax \times (Ya/Ymax)^G \quad \text{(equation 1)}$$

In this case, according to one or more embodiments of the present invention, the first gamma value is larger than 0.55 and smaller than 1 and the second gamma value is larger than 0.15 and smaller than 1. The face detecting image enabling the higher-accuracy face detection processing can be generated using these values.

According to one or more embodiments of the present invention, the representative luminance value is an average value (average luminance value) or a median (median luminance value) of the luminance values of plural pixels. The average luminance value or the median luminance value is likely to express better the lightness of the photographing environment compared with other representative luminance values. Therefore, using the average luminance value or median luminance value, the gamma value can be switched with higher accuracy, and the face detecting image enabling the higher-accuracy face detection processing can be generated.

According to one or more embodiments of the present invention, the representative luminance calculation unit calculates the representative luminance value with no use of at least one of a pixel (high luminance pixel) having the luminance value greater than or equal to a first threshold and a pixel (low luminance pixel) having the luminance value less than or equal to a second threshold smaller than the first threshold. In the photographed image, sometimes an additional image is added to a subject image. Examples of the additional image include a frame image surrounding the subject image, a character superposed on the image, and a graphic superposed on the image. Frequently the luminance value of the additional image is a maximum value (maximum luminance value) of the possible luminance value, a minimum value (minimum luminance value) of the possible luminance value, the luminance value around the maximum luminance value or the minimum luminance value. For this reason, the influence of the luminance value of the additional image on the value calculated by the representative luminance calculation unit can be decreased by excluding the high luminance pixel or the low luminance pixel from the pixels used to calculate the representative luminance value, and the calculated value closer to the representative luminance value of the subject image can be obtained. As a result, the gamma value can be switched with higher accuracy, and the face detecting image enabling the higher-accuracy face detection processing can be generated.

According to one or more embodiments of the present invention, the first threshold is the maximum luminance value and the second threshold is the minimum luminance value because there is a high possibility that the luminance value of the additional image is the maximum luminance value or the minimum luminance value. Therefore, the pixel of the subject image can be restrained from being excluded from the pixel used to calculate the representative luminance value, and the calculated value closer to the representative luminance value of the subject image can be obtained. As a result, the gamma value can be switched with higher accuracy, and the face detecting image enabling the higher-accuracy face detection processing can be generated.

According to one or more embodiments of the present invention, the representative luminance calculation unit calculates the representative luminance value with no use of a pixel (most frequent image) having the luminance value of the largest number of pixels. There is a high possibility that the most frequent image is the pixel of the additional image. For this reason, the influence of the luminance value of the additional image on the value calculated by the representative luminance calculation unit can be decreased by excluding the most frequent image from the pixels used to calculate the representative luminance value, and the calculated value closer to the representative luminance value of the subject image can be obtained. As a result, the gamma value can be switched with higher accuracy, and the face detecting image enabling the higher-accuracy face detection processing can be generated. The similar effect can be obtained in the case that the pixel of the additional image is neither the high luminance pixel nor the low luminance pixel.

According to one or more embodiments of the present invention, the representative luminance calculation unit calculates the representative luminance value with no use of a pixel in an edge portion of the image. There is a high possibility that the pixel of the edge portion is the pixel of the frame image. For this reason, the influence of the luminance value of the frame image on the value calculated by the representative luminance calculation unit can be decreased by excluding the pixel in the edge portion from the pixels used to calculate the representative luminance value, and the calculated value closer to the representative luminance value of the subject image can be obtained. As a result, the gamma value can be switched with higher accuracy, and the face detecting image enabling the higher-accuracy face detection processing can be generated. The similar effect can be obtained in the case that the pixel of the frame image is not the high luminance pixel, the low luminance pixel, or the most frequent image.

According to one or more embodiments of the present invention, the image generator further includes a reduction unit configured to generate a reduced image including pixels not as many as those of the photographed image by performing reduction processing of reducing an image on the photographed image. At this point, the representative luminance calculation unit calculates the representative luminance value of the reduced image. In the configuration, the number of pixels used to calculate the representative luminance value can be decreased, and a processing load necessary for the calculation of the representative luminance value can be decreased.

According to one or more embodiments of the present invention, the representative luminance calculation unit calculates the representative luminance value using only pixels existing every n pixels (n is an integer of 1 or more) in horizontal and vertical directions. In the configuration, the number of pixels used to calculate the representative luminance value can be decreased, and a processing load necessary for the calculation of the representative luminance value can be decreased.

One or more embodiments of present invention may be an image generator including at least a part of the configurations and functions. One or more embodiments of the present invention may be an image generation method including at least a part of the above pieces of processing, a program causing a computer to execute the method, or a computer-readable recording medium in which the program is non-transitorily recorded. One or more embodiments of the present invention may be formed by combining and/or modifying the configurations and processing above.

In one or more embodiments of the present invention, the image enabling the high-accuracy face detection processing can be generated.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

An image generator and an image generation method according to a first embodiment of the present invention will be described below with reference to the drawings. The image generator of the first embodiment generates a face detecting image that is of an image used in face detection processing of detecting a face from the image.

(Configuration of Image Generator)

Figure 1:
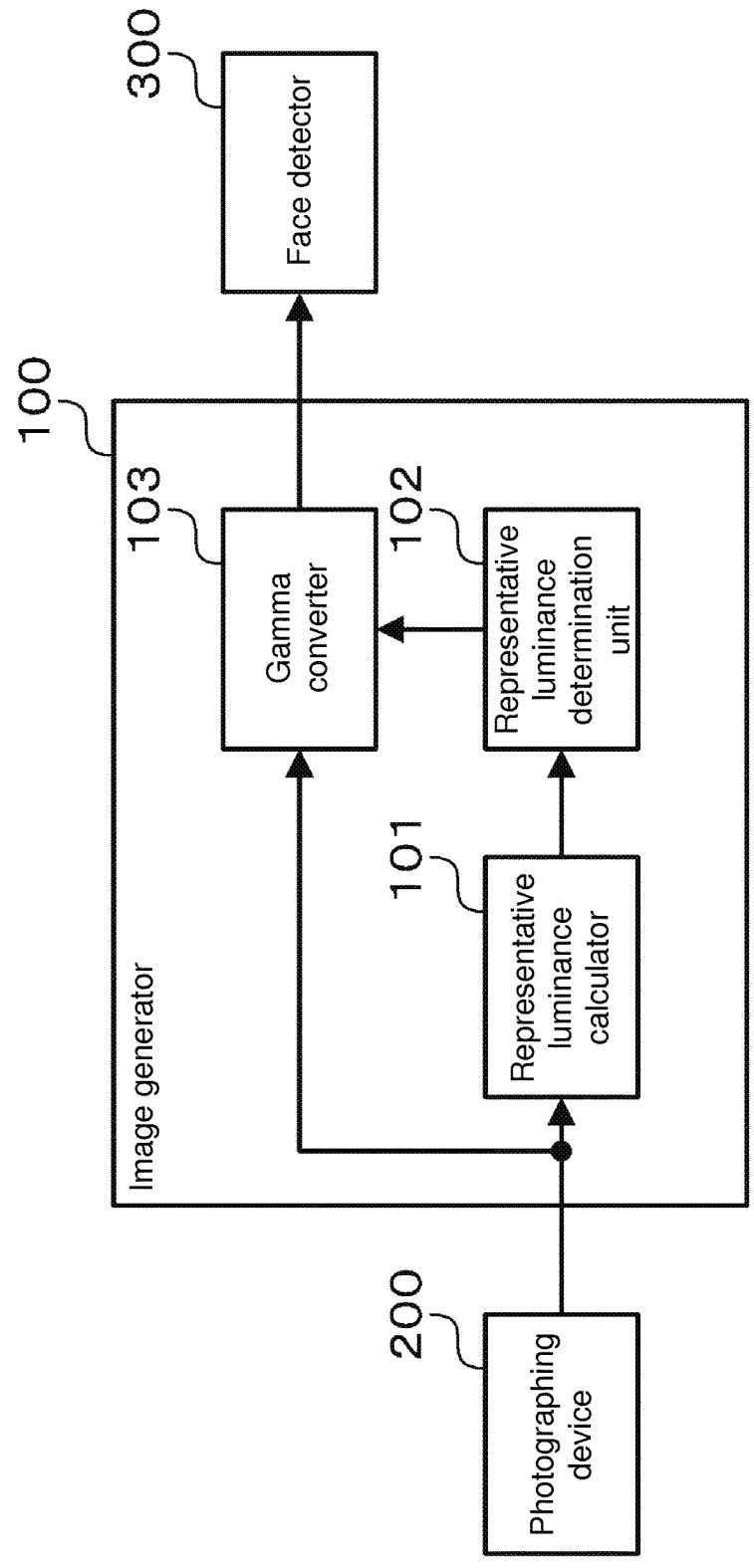
FIG. 1 is a block diagram illustrating an example of a functional configuration of an image generator according to a first embodiment.

A functional configuration of the image generator of the first embodiment will be described with reference to FIG. 1. FIG. 1 is a block diagram illustrating an example of the functional configuration of an image generator 100 of the first embodiment. As illustrated in FIG. 1, the image generator 100 includes a representative luminance calculator 101, a representative luminance determination unit 102, and a gamma converter 103.

At least one of a photographing device 200 and a face detector 300 can be considered as a part of the image generator 100.

The representative luminance calculator 101 acquires a photographed image output from the photographing device 200, and calculates a representative luminance value representing luminance values of pixels of the acquired photographed image. For example, an average value (average luminance value), a median (median luminance value), a mode, a minimum value, and a maximum value of the luminance values of the plural pixels can be used as the representative luminance value. In the first embodiment, an average luminance value Yav that is the average value of the luminance values of all the pixels in the photographed image is calculated as the representative luminance value. As used herein, the photographed image means an image obtained by photographing. In the case that face detection processing of detecting a face of a user in an image display device (such as a television set) that displays the image based on image data is performed, the photographing device 200 photographs the user of the image display device. The representative luminance calculator 101 outputs the calculated average luminance value Yav to the representative luminance determination unit 102.

In the first embodiment, the representative luminance value is used to determine lightness of a photographing environment. The average luminance value or the median luminance value express better the lightness of the photographing environment compared with other representative luminance values. The lightness of the photographing environment can accurately be determined using the average luminance value or the median luminance value. Therefore, according to one or more embodiments of the present invention, the average luminance value or the median luminance value is used as the representative luminance value.

In the first embodiment, the representative luminance value is calculated using all the pixels of the photographed image. However, there is no particular limitation to the representative luminance value calculation method as long as the lightness of the photographing environment can be determined. For example, the representative luminance value may be calculated using only plural pixels existing in a predetermined region (partial region) of the photographed image.

The representative luminance determination unit 102 determines whether the average luminance value Yav output from the representative luminance calculator 101 is greater than or equal to a predetermined threshold Yth. The representative luminance determination unit 102 outputs a determination value F indicating whether the average luminance value Yav is greater than or equal to the threshold Yth to the gamma converter 103. The determination value F=0 is output when the average luminance value Yav is greater than or equal to the threshold Yth, and the determination value F=1 is output when the average luminance value Yav is less than the threshold Yth.

The gamma converter 103 acquires the photographed image output from the photographing device 200 and the determination value F output from the representative luminance determination unit 102. The gamma converter 103 performs gamma conversion processing on the acquired photographed image to generate the face detecting image. In the gamma conversion processing, the luminance value of each pixel of the image is converted using a predetermined gamma value. The gamma converter 103 outputs the generated face detecting image to the face detector 300.

In the first embodiment, the luminance values of all the pixels of the photographed image are converted through the gamma conversion processing. The gamma conversion processing of calculating a luminance value Yb of the face detecting image from a predetermined gamma value G, a luminance value Ya and a maximum possible value Ymax of the luminance value is performed using the following equation 2 in the first embodiment.

$$Yb = Ymax \times (Ya/Ymax)^G \quad \text{(equation 2)}$$

The arithmetic expression of the gamma conversion processing is not limited to the equation 2. Any arithmetic expression may be used as long as the luminance value is converted with a conversion characteristic corresponding to the gamma value.

In the first embodiment, the luminance values of all the pixels of the photographed image are converted. Alternatively, for example, the luminance values of only plural pixels existing in a predetermined region (partial region) of the photographed image may be converted.

Generally, a light and dark pattern unique to the face (light and dark portions having a positional relationship unique to the face) exists in a facial region of a region of the photographed image. For example, the regions near facial organs such as an eye, a nose, and a mouth include a large number of dark pixels, and other regions include a large number of light pixels. For this reason, in the face detection processing, generally a feature amount is acquired from the image in consideration of the light and dark pattern unique to the face, and the face is detected based on the acquired feature amount. For example, a difference in luminance value between two regions having positional relationship equivalent to the light and dark pattern unique to the face is used as the feature amount. Specifically, a Haar-like feature amount corresponding to a light and dark disposition of the facial organ is used as the feature amount. In the face detection processing, the face can accurately be detected from the image in which contrast (difference in luminance value between the light and dark portions of the image) remains to a certain extent.

Therefore, in the first embodiment, the gamma converter 103 performs the gamma conversion processing using a gamma value G1 (first gamma value) less than 1 for the determination value F=0. This enables the generation of the face detecting image having lighter whole image and higher contrast than those of the photographed image. That is, the image enabling the high-accuracy face detection processing can be generated.

At this point, in the case that the average luminance value Yav is greater than or equal to the threshold Yth, there is a high possibility that the photographed image is obtained in a light photographing environment. In the case that the average luminance value Yav is less than the threshold Yth, there is a high possibility that the photographed image is obtained in a dark photographing environment. Therefore, when one gamma value G1 is always used, there is a risk of generating the face detecting image having the low contrast for the average luminance value Yav less than the threshold Yth.

Therefore, in the first embodiment, the gamma converter 103 performs the gamma conversion processing using a gamma value G2 (second gamma value) less than the gamma value G1 for the determination value F=1. This enables the generation of the face detecting image having the lighter whole image and the higher contrast compared with the case of using the gamma value G1. As a result, the face detecting image enabling the high-accuracy face detection processing can be generated irrespective of the lightness of the photographed image.

Figure 2:
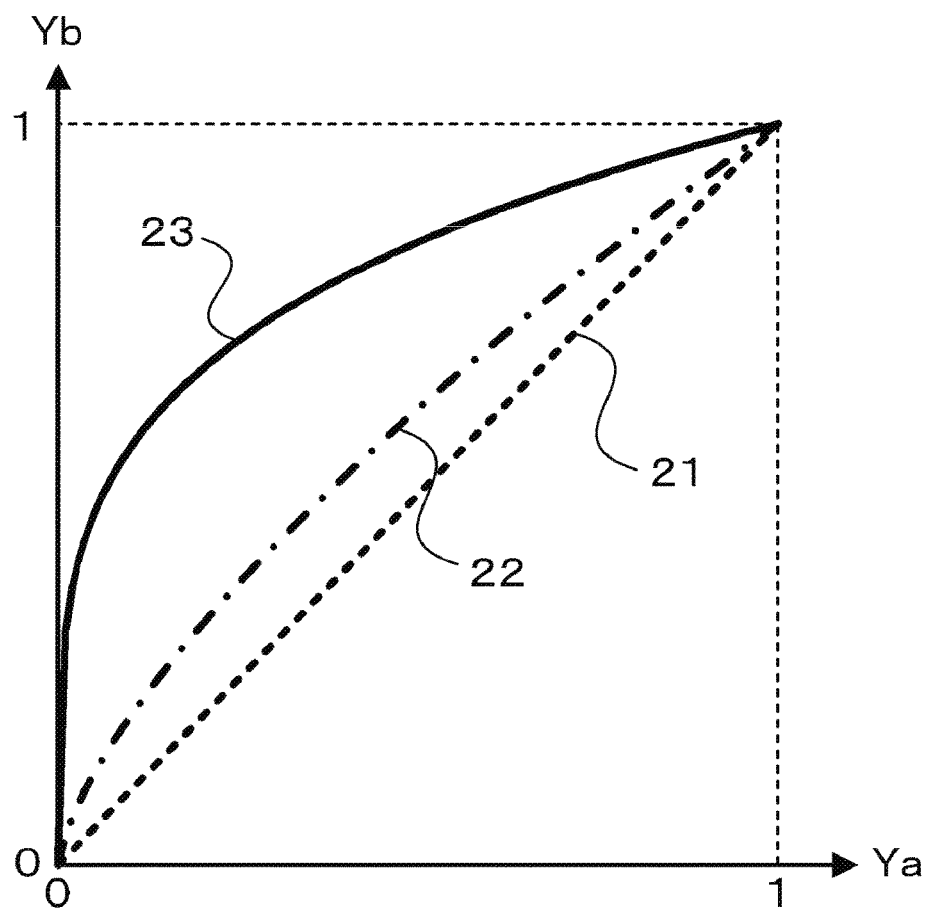
FIG. 2 is a view illustrating an example of a gamma curve according to the first embodiment.

FIG. 2 is a view illustrating an example of a correspondence relation (gamma curve) between the luminance value Ya of the pre-gamma conversion processing and the luminance value Yb of the post-gamma conversion processing. In FIG. 2, a horizontal axis indicates the luminance value Ya of the pre-gamma conversion processing, and a vertical axis indicates the luminance value Yb of the post-gamma conversion processing. FIG. 2 illustrates an example in the case that the possible luminance value ranges from 0 to 1. In FIG. 2, a broken line 21 indicates a gamma curve for the gamma value G=1, an alternate long and short dash line 22 indicates a gamma curve for the gamma value G=G1, and a solid line 23 indicates a gamma curve for the gamma value G=G2.

As can be seen from FIG. 2, in the case that the gamma value G=1 is used, the same value as the luminance value Ya is obtained as the luminance value Yb, and the same image as the photographed image is obtained as the face detecting image. In the case that the gamma value G=G1 is used, the value larger than the luminance value Ya is obtained as the luminance value Yb, and the image lighter than the photographed image is obtained as the face detecting image. In the case that the gamma value G=G2 is used, the luminance value Yb larger than that obtained by using the gamma value G=G1 is obtained, and the face detecting image lighter than that obtained by using the gamma value G=G1 is obtained.

There is no particular limitation to the possible range of the luminance value. For example, the possible luminance value may range from 0 to 255, from 0 to 1023, or from 0 to 4095.

There is no particular limitation to specific values of the gamma values G1 and G2 and a magnitude relationship between the gamma values G1 and G2. For example, desirably the gamma value decreasing the luminance value is used in the immensely light photographing environment. Therefore, the value larger than 1 may be used as the gamma value G1. Any gamma value G2 may be used as long as the face detecting image lighter than that obtained by using the gamma value G1 can be obtained. In other words, any gamma value G1 may be used as long as the face detecting image darker than that obtained by using the gamma value G2 can be obtained. Obviously the specific values of the gamma values G1 and G2 and the magnitude relationship between the gamma values G1 and G2 depend on the arithmetic expression of the gamma conversion processing.

The face detector 300 detects a face from the face detecting image generated by the gamma converter 103 (face detection processing). In the first embodiment, the face detector 300 acquires the feature amount from the face detecting image in consideration of the light and dark pattern unique to the face, and detects the face based on the acquired feature amount. For example, the face detector 300 searches a face-like region from the face detecting image using the Haar-like feature amount corresponding to the light and dark disposition of the facial organ.

(Operation of Image Generator)

Figure 3:
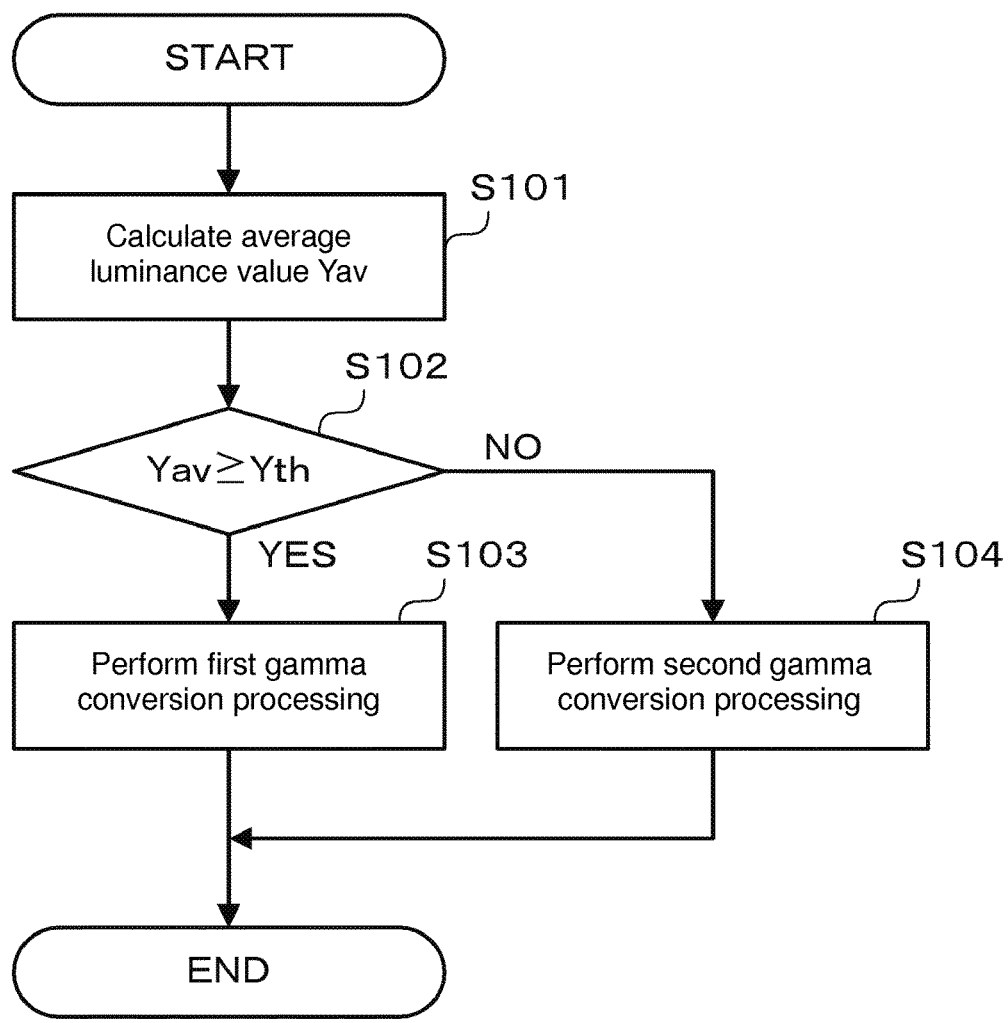
FIG. 3 is a flowchart illustrating an example of operation of the image generator according to the first embodiment.

Operation of the image generator 100 will be described with reference to FIG. 3. FIG. 3 is a flowchart illustrating an example of the operation of the image generator 100.

The representative luminance calculator 101 calculates the average luminance value Yav of the photographed image (S101).

The representative luminance determination unit 102 determines whether the average luminance value Yav calculated in S101 is greater than or equal to the threshold Yth (S102). The processing goes to S103 when the average luminance value Yav is greater than or equal to the threshold Yth (YES in S102), and the processing goes to S104 when the average luminance value Yav is less than the threshold Yth (NO in S102).

In S103, the gamma converter 103 generates the face detecting image by performing the gamma conversion processing (first gamma conversion processing) on the photographed image using the gamma value G1.

In S104, the gamma converter 103 generates the face detecting image by performing the gamma conversion processing (second gamma conversion processing) on the photographed image using the gamma value G2.

SUMMARY

As described above, in the first embodiment, in the case that the representative luminance value is greater than or equal to a predetermined threshold, the face detecting image is generated by performing the gamma conversion processing on the photographed image using the gamma value G1. In the case that the representative luminance value is less than the predetermined threshold, the face detecting image is generated by performing the gamma conversion processing on the photographed image using the gamma value G2 that can obtain the face detecting image lighter than that obtained by using the gamma value G1. Therefore, the face detecting image enabling the high-accuracy face detection processing can be generated irrespective of the lightness of the photographed image.

(Gamma Values G1 and G2)

As described above, any values may be used as the gamma values G1 and G2. However, in the case that the gamma conversion processing is performed used the equation 2, desirably the gamma value G1 is larger than 0.55 and smaller than 1, and particularly desirably the gamma value G1 is 0.7. Desirably the gamma value G2 is larger than 0.15 and smaller than 1, and particularly desirably the gamma value G2 is 0.25. The face detecting image enabling the higher-accuracy face detection processing can be generated using these values as the gamma values G1 and G2.

The inventor performed a first experiment using many photographed images obtained by photographing the face. In the first experiment, the possible luminance value ranges from 0 to 1. In the first experiment, many first adjusted images, many second adjusted images, many third adjusted images, many fourth adjusted images, and many fifth adjusted images were generated by performing luminance adjustment processing of adjusting the luminance value on each of the many photographed images (original images). The first adjusted image has the average luminance value Yav of 0.39, the second adjusted image has the average luminance value Yav of 0.19, the third adjusted image has the average luminance value Yav of 0.15, the fourth adjusted image has the average luminance value Yav of 0.11, and the fifth adjusted image has the average luminance value Yav of 0.07. The gamma conversion processing of generating the face detecting image from the adjusted image and the face detection processing were performed on each adjusted image (the first to fifth adjusted images) while the gamma value was changed from 1 to 10. For the gamma value of 1, the same image as the adjusted image is obtained as the face detecting image. Therefore, the gamma value of 1 corresponds to the case that the gamma conversion processing is not performed. Needless to say, in the first experiment, the gamma value is not switched according to the average luminance value Yav.

Figure 4:
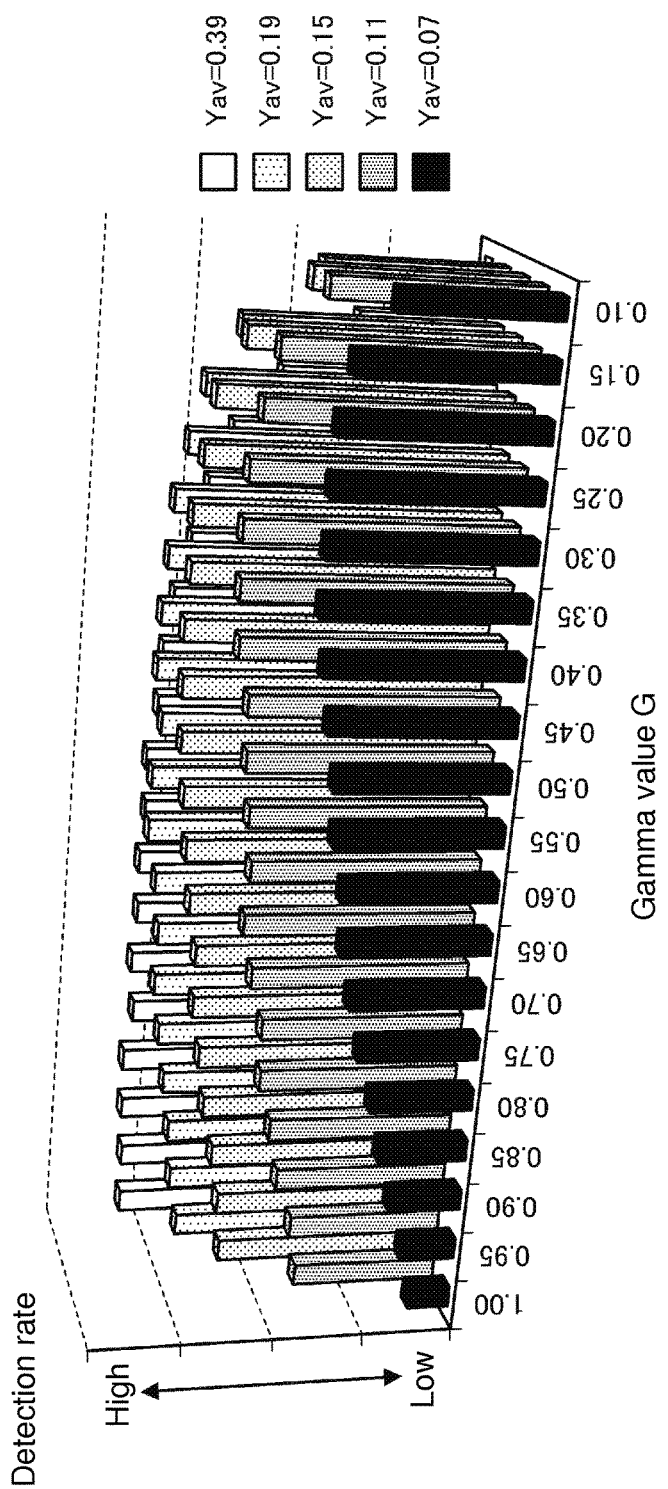
FIG. 4 is a view illustrating an example of a correspondence relation between a gamma value and a face detection rate of the first embodiment.

An experimental result in FIG. 4 is obtained through a first experiment. FIG. 4 is a view illustrating an example of a correspondence relation between the gamma value G and a face detection rate. In FIG. 4, a horizontal axis indicates the gamma value G, and a vertical axis indicates the face detection rate. The detection rate means a ratio of the number of images in each of which the face is successfully detected to the total number of images. The higher detection rate means the higher accuracy of the face detection processing, and the lower detection rate means the lower accuracy of the face detection processing.

In this case, it is assumed that the adjusted image (first adjusted image) having the average luminance value Yav of 0.39 is a "light photographed image", and that the photographed images (second to fifth adjusted images) having the average luminance values Yav=0.19, 0.15, 0.11, and 0.07 are "dark photographed images". As can be seen from FIG. 4, in the light photographed image, the detection rate is maximized at the gamma value G of 0.7. When the gamma value G1 of 0.7 is used, the face detecting image enabling the face detection processing having the accuracy higher than all the cases that other gamma values are used can be generated from the light photographed image. In the light photographed image, the detection value higher than that of the gamma value G of 1 is obtained when the gamma value G has the range of 0.55<G<1. When the value that is larger than 0.55 and smaller than 1 is used as the gamma value G1, the face detecting image enabling the face detection processing having the accuracy higher than the case that the gamma conversion processing is not performed can be generated from the light photographed image.

In the dark photographed image, the detection rate is maximized at the gamma value G of 0.25. When the gamma value G2 of 0.25 is used, the face detecting image enabling the face detection processing having the accuracy higher than all the cases that other gamma values are used can be generated from the dark photographed image. In the dark photographed image, the detection value higher than that of the gamma value G of 1 is obtained when the gamma value G has the range of 0.15<G<1. When the value that is larger than 0.15 and smaller than 1 is used as the gamma value G2, the face detecting image enabling the face detection processing having the accuracy higher than the case that the gamma conversion processing is not performed can be generated from the dark photographed image.

(Threshold Yth)

Any value may be used as the threshold Yth. However, in the case that the possible average luminance value Yav ranges from 0 to 1, desirably the threshold Yth is larger than 0.25 and smaller than 0.41, and particularly desirably the threshold Yth is 0.33.

The inventor performed a second experiment using many photographed images obtained by photographing the face. In the second experiment, the possible average luminance value Yav ranges from 0 to 1. In the second experiment, the gamma conversion processing of generating the face detecting image from the original image and the face detection processing were performed on each original image (each of the many original images used in the first experiment) while the gamma value was changed from 0 to 1. In the second experiment, the gamma value of 0.7 was used in the case that the average luminance value Yav was greater than or equal to the threshold Yth, and the gamma value of 0.25 was used in the case that the average luminance value Yav was less than the threshold Yth. In the second experiment, the adjusted image is not generated.

Figure 5:
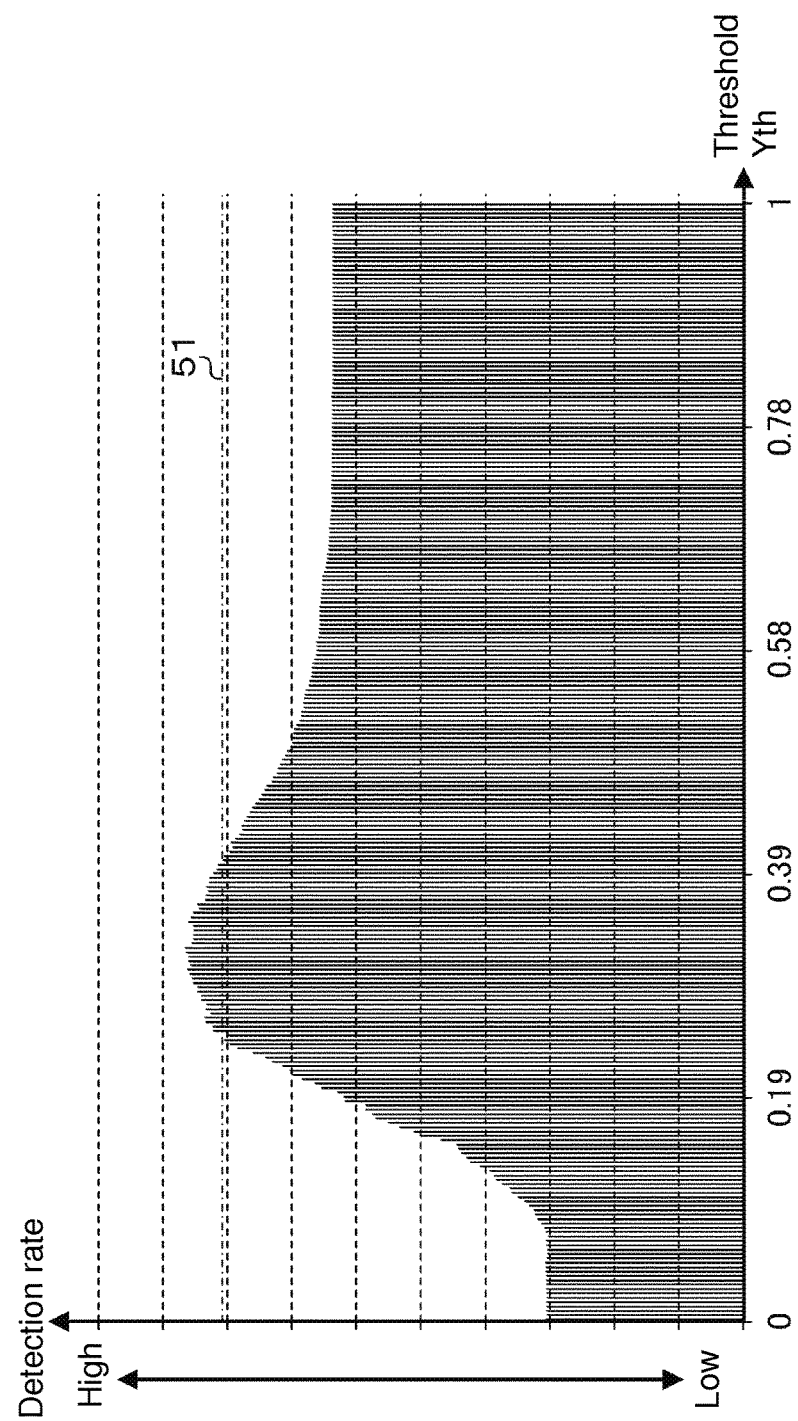
FIG. 5 is a view illustrating an example of a correspondence relation between a predetermined threshold and the face detection rate of the first embodiment.

An experimental result in FIG. 5 was obtained by the second experiment. FIG. 5 is a view illustrating an example of a correspondence relation between the threshold Yth and the face detection rate. In FIG. 5, a horizontal axis indicates the threshold Yth, and a vertical axis indicates the face detection rate. In FIG. 5, an alternate long and short dash line 51 indicates a target detection rate. There is no particular limitation to the target detection rate. For example, the target detection rate is decided based on the detection rate of the threshold Yth of 0. The higher detection rate may be used as the target detection rate as a target value of the accuracy of the face detection processing increases.

As can be seen from FIG. 5, the detection rate is maximized at the threshold Yth of 0.33. The face detecting image enabling the face detection processing having the accuracy higher than all the cases that other values are used as the threshold Yth can be generated when the threshold Yth of 0.33 is used. The detection value higher than the target detection rate is obtained when the threshold Yth has the range of 0.25<Yth<0.41. The face detecting image enabling the face detection processing having the accuracy higher than the target accuracy can be generated when the value larger than 0.25 and smaller than 0.41 is used as the threshold Yth.

Second Embodiment

An image generator and an image generation method according to a second embodiment of the present invention will be described below with reference to the drawing. The second embodiment differs from the first embodiment in a method for calculating representative luminance value. In the second embodiment, the description of the configuration and processing similar to those of the first embodiment is omitted.

Figure 6:
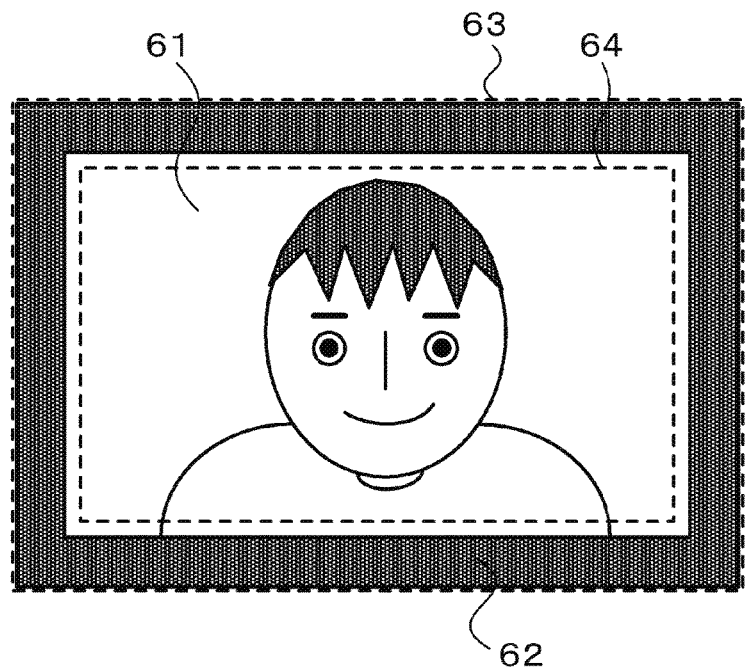
FIG. 6 is a view illustrating an example of a photographed image according to second and third embodiments.

FIG. 6 illustrates an example of the photographed image of the second embodiment. In the photographed image, sometimes an additional image is added to a subject image. For example, sometimes a frame image 62 surrounding a subject image 61 is added as illustrated in FIG. 6. Sometimes additional images such as a character and a graphic are superposed on the image.

In order to generate the face detecting image enabling the higher-accuracy face detection processing, desirably whether the calculated representative luminance value is greater than or equal to the predetermined threshold means whether the photographed image is obtained in the light photographing environment or whether the photographed image is obtained in the dark photographing environment. When the calculated representative luminance value is the representative luminance value of the subject image 61, it can be said that "whether the calculated representative luminance value is greater than or equal to the predetermined threshold means whether the photographed image is obtained in the light photographing environment or whether the photographed image is obtained in the dark photographing environment".

However, when the representative luminance value is calculated using the plural pixels including the pixels of the additional image, sometimes the representative luminance value having a large error (a difference with the average luminance value of the subject image) is calculated due to an influence of the luminance value of the additional image. For example, when the representative luminance value is calculated using the luminance values of plural pixels including the pixels of the frame image 62, sometimes the representative luminance value having a large difference with the representative luminance value of the subject image 61 is calculated due to an influence of the luminance value of the frame image 62.

Therefore, in the second embodiment, the representative luminance calculator 101 calculates the representative luminance value with no use of at least one of the pixel (high luminance pixel) having the luminance value greater than or equal to a first threshold and the pixel (low luminance pixel) having the luminance value less than or equal to a second threshold less than the first threshold. For example, the average value of the luminance values of the plural pixels except for the low luminance pixel is calculated as the average luminance value Yav.

The average value of the luminance values of the plural pixels except for the high luminance pixel may be calculated as the average luminance value Yav. The average value of the luminance values of the plural pixels that is neither the high luminance pixel nor the low luminance pixel may be calculated as the average luminance value Yav.

As described above, in the second embodiment, the high luminance pixel or the low luminance pixel is excluded from the pixel used to calculate the representative luminance value. Therefore, the face detecting image enabling the higher-accuracy face detection processing can be generated. Specifically, frequently the luminance value of the additional image (such as the frame image, the character, and the graphic) is the maximum value (maximum luminance value Ymax) of the possible luminance value, the minimum value (minimum luminance value Ymin) of the possible luminance value, or the luminance value around the maximum luminance value Ymax or the minimum luminance value Ymin. The maximum luminance value Ymax is a white luminance value, and the minimum luminance value Ymin is a black luminance value. In the case that the possible luminance value ranges from 0 to 1, the maximum luminance value Ymax is 1 and the minimum luminance value Ymin is 0. For this reason, the influence of the luminance value of the additional image on the value (representative luminance value) calculated by the representative luminance calculator 101 can be decreased by excluding the high luminance pixel or the low luminance pixel, and the calculated value closer to the representative luminance value of the subject image can be obtained. As a result, the gamma value can be switched with higher accuracy, and the face detecting image enabling the higher-accuracy face detection processing can be generated.

Any value may be used as the first and second thresholds. For example, the value smaller than the maximum luminance value Ymax may be used as the first threshold, and the value larger than the minimum luminance value Ymin may be used as the second threshold. However, there is a particularly high possibility that the luminance value of the additional image is the maximum luminance value or the minimum luminance value. Desirably the first threshold is the maximum luminance value and the second threshold is the minimum luminance value. Therefore, the pixel of the subject image can be restrained from being excluded from the pixel used to calculate the representative luminance value, and the representative luminance value closer to the representative luminance value of the subject image can be obtained. As a result, the gamma value can be switched with higher accuracy, and the face detecting image enabling the higher-accuracy face detection processing can be generated.

There is a high possibility that the pixel (most frequent image) having the luminance value of the largest number of pixels is the pixel of the additional image. Therefore, desirably the representative luminance value is calculated with no use of the most frequent image. The influence of the luminance value of the additional image on the value calculated by the representative luminance calculator 101 can be decreased by excluding the most frequent image from the pixel used to calculate the representative luminance value, and the calculated value closer to the representative luminance value of the subject image can be obtained. As a result, the gamma value can be switched with higher accuracy, and the face detecting image enabling the higher-accuracy face detection processing can be generated. The similar effect can be obtained in the case that the pixel of the additional image is neither the high luminance pixel nor the low luminance pixel. The most frequent image and the high luminance pixel may be excluded from the pixel used to calculate the representative luminance value, and the most frequent image and the low luminance pixel may be excluded from the pixel used to calculate the representative luminance value. The most frequent image, the low luminance pixel, and the high luminance pixel may be excluded from the pixel used to calculate the representative luminance value.

Third Embodiment

An image generator and an image generation method according to a third embodiment of the present invention will be described below with reference to the drawing. The third embodiment differs from the first embodiment in a method for calculating representative luminance value. In the third embodiment, the description of the configuration and processing similar to those of the first embodiment is omitted.

In the third embodiment, the representative luminance calculator 101 calculates the representative luminance value with no use of the pixel in an edge portion of the image. For example, the average value of the luminance values of the plural pixels existing in the region except for the edge portion is calculated as the average luminance value Yav. For example, the edge portion is a region including a predetermined number of pixels from an edge of the image toward a center of the image. Specifically, as illustrated in FIG. 6, the region from a broken line 63 (four sides of the photographed image) to a broken line 64 is used as the edge portion. In the example of FIG. 6, the edge portion includes the whole frame image 62 and a part of the subject image 61.

The edge portion may include the whole frame image 62 or a part of the frame image 62. The edge portion may include the subject image 61 or not include the subject image 61.

A region including the predetermined number of pixels from a part of the four sides of the image toward the center of the image may be used as the edge portion. That is, one, two, or three of the following four regions may be used as the edge portion. In the example of FIG. 6, all the following four regions are used as the edge portion.

A region including the predetermined number of pixels from the upper side of the image toward the lower side.

A region including the predetermined number of pixels from the lower side of the image toward the upper side.

A region including the predetermined number of pixels from the left side of the image toward the right side.

A region including the predetermined number of pixels from the right side of the image toward the left side.

As described above, in the third embodiment, the pixel in the edge portion is excluded from the pixel used to calculate the representative luminance value. Therefore, the face detecting image enabling the higher-accuracy face detection processing can be generated. Specifically, there is a high possibility that the pixel of the edge portion is the pixel of the frame image. For this reason, the influence of the luminance value of the frame image on the value calculated by the representative luminance calculator 101 can be decreased by excluding the pixel in the edge portion, and the calculated value closer to the representative luminance value of the subject image can be obtained. As a result, the gamma value can be switched with higher accuracy, and the face detecting image enabling the higher-accuracy face detection processing can be generated. The similar effect can be obtained in the case that the pixel of the frame image is not the high luminance pixel, the low luminance pixel, or the most frequent image.

Fourth Embodiment

An image generator and an image generation method according to a fourth embodiment of the present invention will be described below with reference to the drawing. In the fourth embodiment, the description of the configuration and processing similar to those of the first embodiment is omitted.

Figure 7:
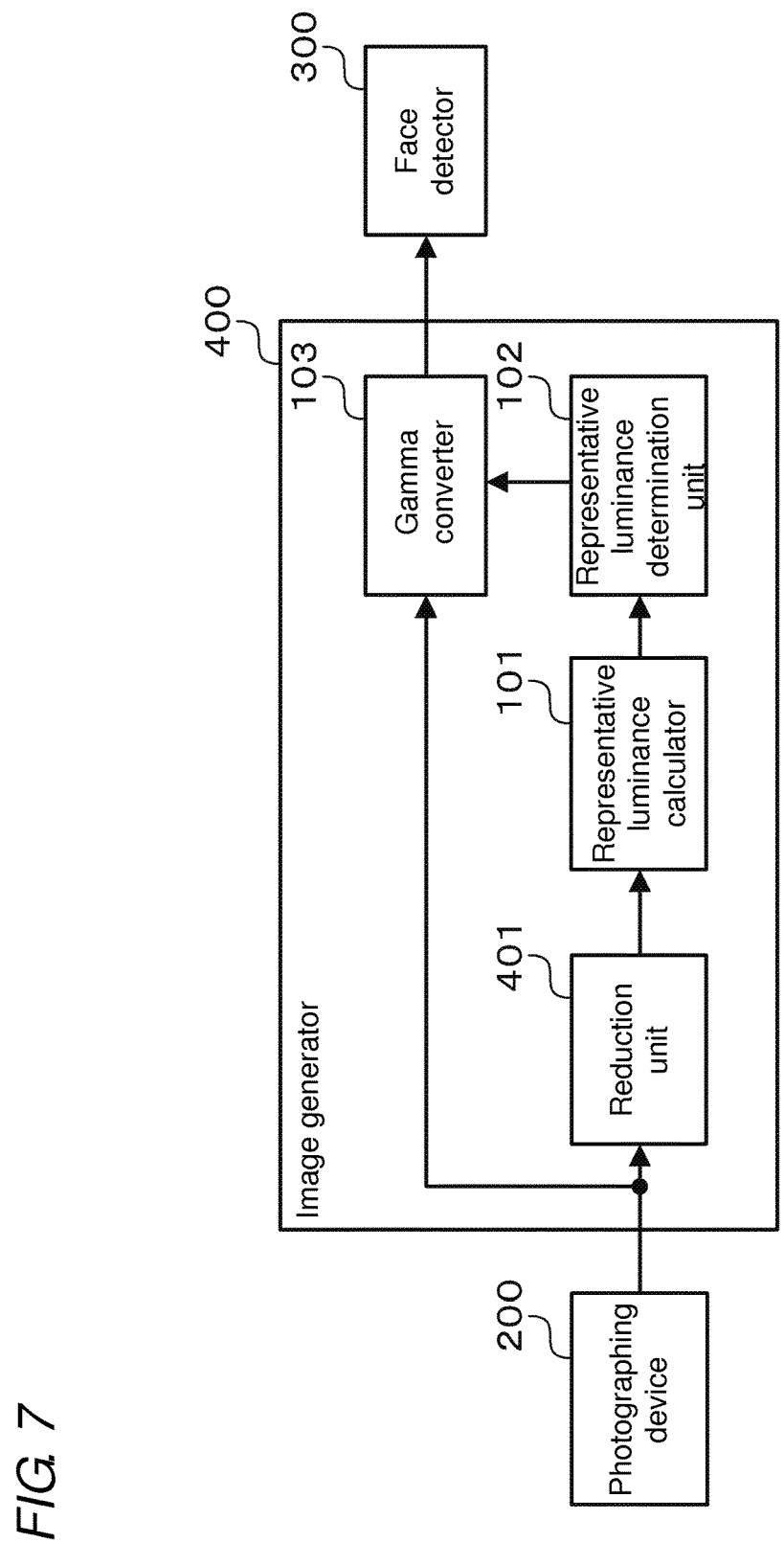
FIG. 7 is a block diagram illustrating an example of a functional configuration of an image generator according to a fourth embodiment.

FIG. 7 is a block diagram illustrating an example of the functional configuration of an image generator 400 of the fourth embodiment. In FIG. 7, the same functional unit as the first embodiment (FIG. 1) is designated by the same numeral as the first embodiment, and the description is omitted. As illustrated in FIG. 7, the image generator 400 further includes a reduction unit 401 in addition to the functional units of the image generator 100.

Figure 8:
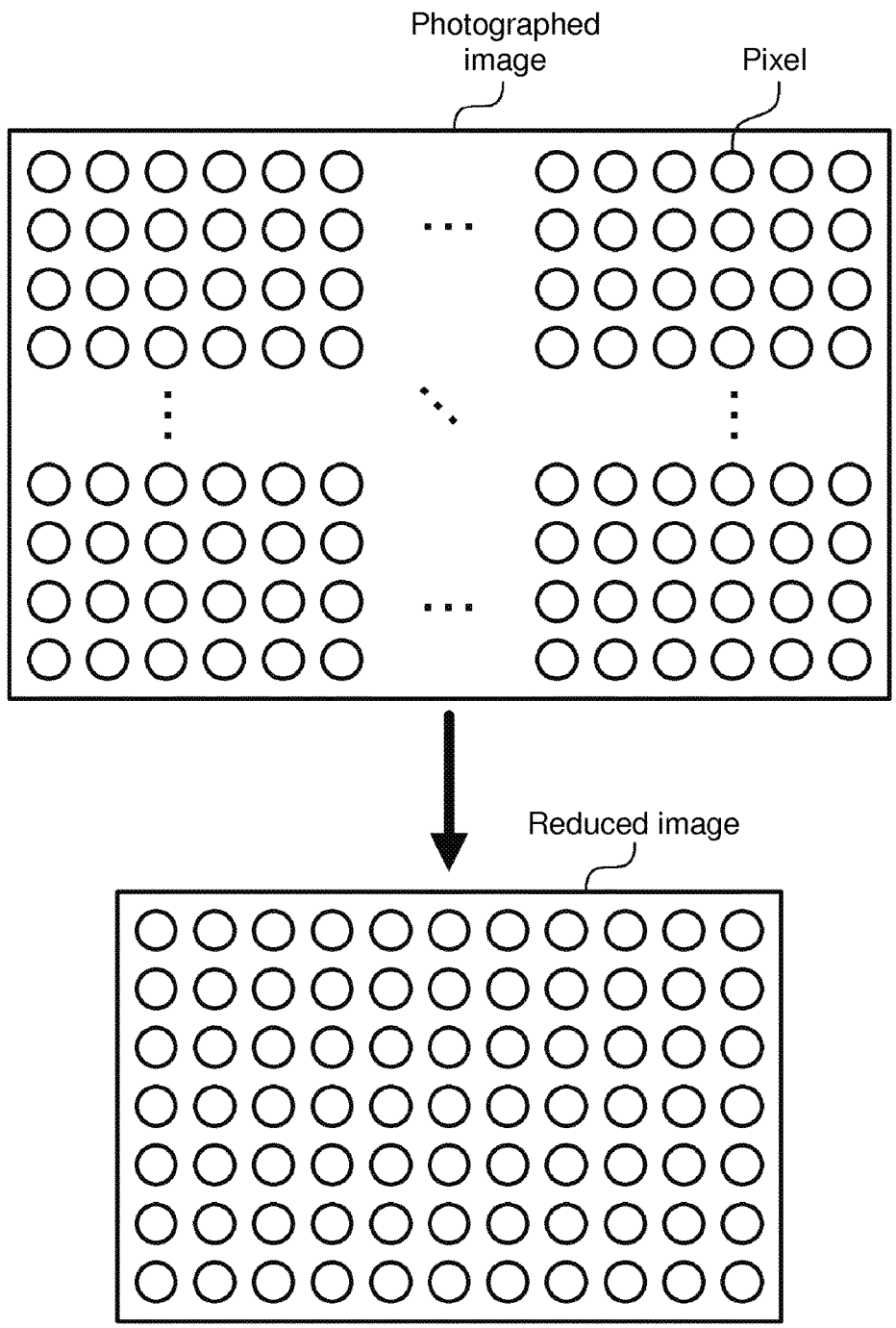
FIG. 8 is a view illustrating examples of a photographed image and a reduced image of the fourth embodiment.

The reduction unit 401 acquires the photographed image output from the photographing device 200, and performs reduction processing on the acquired photographed image. The reduction processing means processing of reducing the image. FIG. 8 is a view illustrating examples of the photographed image and the reduced image of the fourth embodiment. As illustrated in FIG. 8, a reduced image including the pixels not as many as the photographed image is generated by performing the reduction processing on the photographed image. The reduction unit 401 outputs the generated reduced image to the representative luminance calculator 101. The representative luminance calculator 101 calculates the representative luminance value of the reduced image as the representative luminance value of the photographed image.

As described above, in the fourth embodiment, the reduced image including the pixels not as many as the photographed image is generated by performing the reduction processing on the photographed image. The representative luminance value of the reduced image is calculated as the representative luminance value of the photographed image. Therefore, the number of pixels used to calculate the representative luminance value can be decreased, and a processing load necessary for the calculation of the representative luminance value can be decreased.

Fifth Embodiment

An image generator and an image generation method according to a fifth embodiment of the present invention will be described below with reference to the drawing. The fifth embodiment differs from the first embodiment in a method for calculating representative luminance value. In the fifth embodiment, the description of the configuration and processing similar to those of the first embodiment is omitted.

Figure 9:
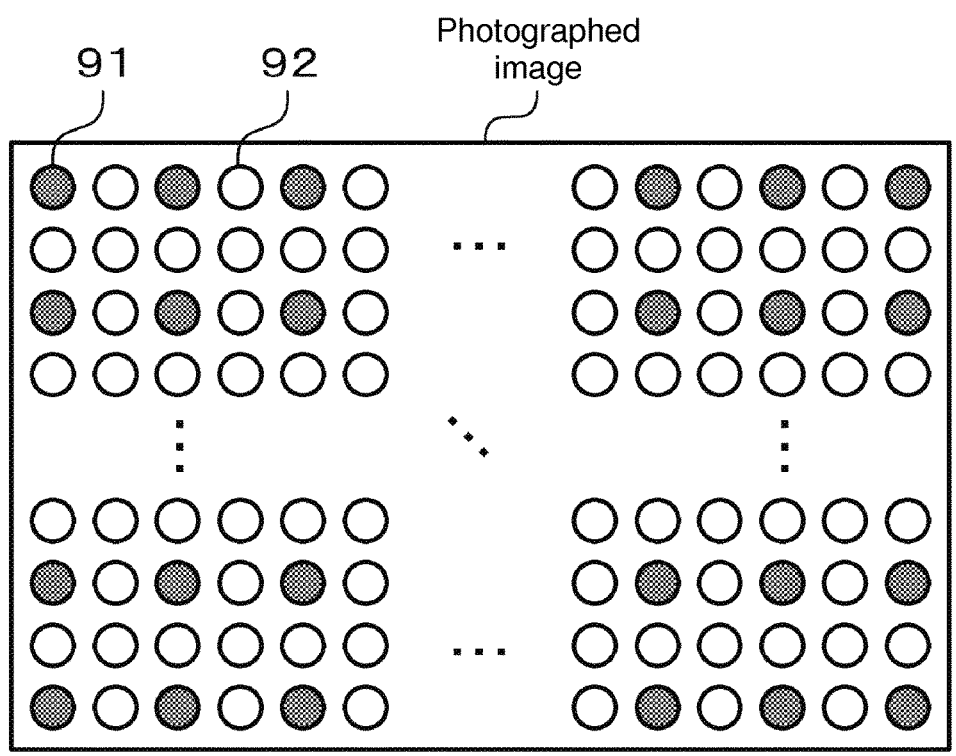
FIG. 9 is a view illustrating an example of a photographed image according to a fifth embodiment.

FIG. 9 is a view illustrating an example of the photographed image of the fifth embodiment. In FIG. 9, the numerals 91 and 92 indicate the pixels. Specifically, the pixel 91 is used to calculate the representative luminance value, and the pixel 92 is not used to calculate the representative luminance value. In the fifth embodiment, as illustrated in FIG. 9, the representative luminance calculator 101 calculates the representative luminance value using only pixels existing every n pixels (n is an integer of 1 or more) in horizontal and vertical directions. For example, the average value of the luminance values of the plural pixels existing every n pixels in the horizontal and vertical directions is calculated as the average luminance value Yav. Although FIG. 9 illustrates an example for n=1, n may be larger than 1.

As described above, in the fifth embodiment, the representative luminance value is calculated using only the pixels existing every n pixels in the horizontal and vertical directions. Therefore, the number of pixels used to calculate the representative luminance value can be decreased, and a processing load necessary for the calculation of the representative luminance value can be decreased.

The first to fifth embodiments are described only by way of example, and configurations obtained by properly modifying or changing the configurations of the first to fifth embodiments are also included in the present invention. A configuration obtained by a proper combination of the first to fifth embodiments is also included in the present invention. For example, the fourth and fifth embodiments may be combined such that the representative luminance value is calculated using the pixels existing every n pixels in the generated reduced image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A non-transitory computer readable medium comprising a program executable on a computer to generate a face detecting image used in face detection processing of detecting a face from a photographed image, the program causing the computer to perform:
    calculating a representative luminance value representing a luminance value of each pixel of the photographed image obtained by photographing;
    determining whether the representative luminance value is greater than or equal to a predetermined threshold; and
    generating the face detecting image by performing gamma conversion processing on the photographed image,
    wherein the luminance value of each pixel of the photographed image is converted using a predetermined gamma value,
    wherein the gamma conversion processing is performed using a first gamma value to obtain a first face detecting image, when the representative luminance value that is calculated is greater than or equal to the predetermined threshold,
    wherein the gamma conversion processing is performed using a second gamma value to obtain a second face detecting image when the representative luminance value is less than the predetermined threshold,
    wherein the second face detecting image is lighter than the first face detecting image, and
    wherein the predetermined threshold is larger than 0.25 and smaller than 0.41 when a possible representative luminance value ranges from 0 to 1.

2. A non-transitory computer readable medium comprising a program executable on a computer to generate a face detecting image used in face detection processing of detecting a face from a photographed image, the program causing the computer to perform:
    calculating a representative luminance value representing a luminance value of each pixel of the photographed image obtained by photographing;
    determining whether the representative luminance value is greater than or equal to a predetermined threshold; and
    generating the face detecting image by performing gamma conversion processing on the photographed image,
    wherein the luminance value of each pixel of the photographed image is converted using a predetermined gamma value,
    wherein the gamma conversion processing is performed using a first gamma value to obtain a first face detecting image, when the representative luminance value that is calculated is greater than or equal to the predetermined threshold,
    wherein the gamma conversion processing is performed using a second gamma value to obtain a second face detecting image when the representative luminance value is less than the predetermined threshold, wherein the second face detecting image is lighter than the first face detecting image, wherein the gamma conversion processing is processing of calculating the luminance value Yb of the face detecting image from the predetermined gamma value G, a luminance value Ya of the photographed image, and a maximum value Ymax of a possible luminance value using the following equation 1:

$$Yb=Y\text{max}\times(Ya/Y\text{max})^G \quad \text{(equation 1), and}$$

wherein the first gamma value is larger than 0.55 and smaller than 1.

3. A non-transitory computer readable medium comprising a program executable on a computer to generate a face detecting image used in face detection processing of detecting a face from a photographed image, the program causing the computer to perform:

calculating a representative luminance value representing a luminance value of each pixel of a photographed image obtained by photographing;

determining whether the representative luminance value is greater than or equal to a predetermined threshold; and generating the face detecting image by performing gamma conversion processing on the photographed image, wherein the luminance value of each pixel of the photographed image is converted using a predetermined gamma value, wherein the gamma conversion processing is performed using a first gamma value to obtain a first face detecting image, when the representative luminance value that is calculated is greater than or equal to the predetermined threshold, wherein the gamma conversion processing is performed using a second gamma value to obtain a second face detecting image when the representative luminance value is less than the predetermined threshold, wherein the second face detecting image is lighter than the first face detecting image, wherein the gamma conversion processing is processing of calculating the luminance value Yb of the face detecting image from the predetermined gamma value G, a luminance value Ya of the photographed image, and a maximum value Ymax of a possible luminance value using the following equation 2:

$$Yb=Y\text{max}\times(Ya/Y\text{max})^G \quad \text{(equation 2), and}$$

wherein the second gamma value is larger than 0.15 and smaller than 1.

4. The non-transitory computer readable medium comprising the program according to claim 1, wherein the representative luminance value is an average value or a median of the luminance values of a plurality of pixels.

5. The non-transitory computer readable medium comprising the program according to claim 1, wherein the representative luminance value is calculated with no use of at least one of a pixel having the luminance value greater than or equal to a first threshold and a pixel having the luminance value less than or equal to a second threshold smaller than the first threshold.

6. The non-transitory computer readable medium comprising the program according to claim 5, wherein the first threshold is a maximum value of a possible luminance value, and wherein the second threshold is a minimum value of the possible luminance value.

7. The non-transitory computer readable medium comprising the program according to claim 1, wherein, when calculating the representative luminance value, pixels having a luminance value that is shared with a largest number of pixels are excluded.

8. The non-transitory computer readable medium comprising the program according to claim 1, wherein the representative luminance value is calculated with no use of a pixel in an edge portion of the photographed image.

9. The non-transitory computer readable medium comprising the program according to claim 1, the program causing the computer to further perform:

generating a reduced image including pixels not as many as those of the photographed image by performing reduction processing of reducing an image on the photographed image, wherein the representative luminance value of the reduced image is calculated.

10. The non-transitory computer readable medium comprising the program according to claim 1, wherein the representative luminance value is calculated using only pixels existing every n pixels in horizontal and vertical directions, and wherein n is an integer of 1 or more.

11. An image generation method for generating a face detecting image used in face detection processing of detecting a face from a photographed image, the image generation method comprising:

calculating a representative luminance value representing a luminance value of each pixel of the photographed image obtained by photographing;

determining whether the representative luminance value is greater than or equal to a predetermined threshold; and generating the face detecting image by performing gamma conversion processing on the photographed image, the luminance value of each pixel of the photographed image being converted using a predetermined gamma value, wherein, the gamma conversion processing is performed using a first gamma value to obtain a first face detecting image, when the representative luminance value that is calculated is greater than or equal to the predetermined threshold, and wherein the gamma conversion processing is performed using a second gamma value to obtain a second face detecting image when the representative luminance value is less than the predetermined threshold, wherein the second face detecting image is lighter than the first face detecting image, and wherein the predetermined threshold is larger than 0.25 and smaller than 0.41 when a possible representative luminance value ranges from 0 to 1.

12. The non-transitory computer readable medium comprising the program according to claim 1, wherein the gamma conversion processing is processing of calculating the luminance value Yb of the face detecting image from the predetermined gamma value G, a luminance value Ya of the photographed image, and a maximum value Ymax of a possible luminance value using the following equation 1:

$$Yb=Y\text{max}\times(Ya/Y\text{max})^G \quad \text{(equation 1), and}$$

wherein the first gamma value is larger than 0.55 and smaller than 1.

13. The non-transitory computer readable medium comprising the program according to claim 1,
wherein the gamma conversion processing is processing of calculating the luminance value Yb of the face detecting image from the predetermined gamma value G, a luminance value Ya of the photographed image, and a maximum value Ymax of a possible luminance value using the following equation 2:

$$Yb = Y\text{max} \times (Ya/Y\text{max})^G \quad \text{(equation 2), and}$$

wherein the second gamma value is larger than 0.15 and smaller than 1.

14. The non-transitory computer readable medium comprising the program according to claim 2,
wherein the gamma conversion processing is processing of calculating the luminance value Yb of the face detecting image from the predetermined gamma value G, a luminance value Ya of the photographed image, and a maximum value Ymax of the possible luminance value using the following equation 2:

$$Yb = Y\text{max} \times (Ya/Y\text{max})^G \quad \text{(equation 2), and}$$

wherein the second gamma value is larger than 0.15 and smaller than 1.

15. The non-transitory computer readable medium comprising the program according to claim 1, wherein the representative luminance value is an average value or a median of the luminance values of a plurality of pixels.

16. The non-transitory computer readable medium comprising the program according to claim 2, wherein the representative luminance value is an average value or a median of the luminance values of a plurality of pixels.

17. The non-transitory computer readable medium comprising the program according to claim 3, wherein the representative luminance value is an average value or a median of the luminance values of a plurality of pixels.

18. The non-transitory computer readable medium comprising the program according to claim 1, wherein the representative luminance value is calculated with no use of at least one of a pixel having the luminance value greater than or equal to a first threshold and a pixel having the luminance value less than or equal to a second threshold smaller than the first threshold.

19. The non-transitory computer readable medium comprising the program according to claim 2, wherein the representative luminance value is calculated with no use of at least one of a pixel having the luminance value greater than or equal to a first threshold and a pixel having the luminance value less than or equal to a second threshold smaller than the first threshold.

\* \* \* \* \*